United States Patent [19]
Grant et al.

[11] Patent Number: 5,276,966
[45] Date of Patent: * Jan. 11, 1994

[54] ENHANCED STORED CHEMICAL ENERGY POWERED BOILER

[75] Inventors: George Grant, Akron; George B. Watson, Alliance, both of Ohio

[73] Assignee: The Babcock & Wilcox Company, New Orleans, La.

[*] Notice: The portion of the term of this patent subsequent to Aug. 18, 2009 has been disclaimed.

[21] Appl. No.: 938,723

[22] Filed: Sep. 1, 1992

[51] Int. Cl.$^5$ .............................................. B23P 15/06
[52] U.S. Cl. ................... 29/890.042; 29/463; 29/890.039; 228/157
[58] Field of Search ............ 29/890.042, 463, 890.036, 29/890.037, 890.039, 421.1; 228/157

[56] References Cited

U.S. PATENT DOCUMENTS

| | | | |
|---|---|---|---|
| 3,147,545 | 9/1964 | Valyi | 29/890.042 |
| 3,200,480 | 8/1965 | Heuer | 29/890.042 |
| 3,201,858 | 8/1965 | Valyi | 29/890.042 |
| 3,340,589 | 9/1967 | Jaeger | 29/890.042 |
| 3,690,140 | 9/1972 | Shive | 29/890.042 |
| 3,831,246 | 8/1974 | Morris | 29/890.042 |
| 5,138,765 | 8/1992 | Watson et al. | 29/890.042 |

Primary Examiner—Irene Cuda
Attorney, Agent, or Firm—Robert J. Edwards; Vytas R. Matas; Daniel S. Kalka

[57] ABSTRACT

A method for manufacturing a studded flow channel (38) results in enhancing the heat transfer performance of a hydraulically expanded heat exchanger such as a coiled tube boiler (10). The studs are machined or rolled into a flat metal sheet (20) prior to forming a cylinder. One cylinder (28) is rolled so that the studs are located outside the cylinder while another embodiment positions the studs on the inside of a cylinder. The cylinders are positioned one inside the other and electron beam welded to form a helical weld path (16). A pressure fitting (34) is attached to the welded cylinder (36) and hydraulic pressure (P) is applied to deform the cylinders (28, 32) between the helical weld path thus creating a studded flow channel (38).

11 Claims, 6 Drawing Sheets

Fully studded membrane walls

ENHANCED STORED CHEMICAL ENERGY POWERED BOILER

BACKGROUND OF THE INVENTION

1. Field of the Invention

The present invention relates in general to a method of improving heat transfer in stored chemical energy powered coiled tube boiler and, in particular, to a method for enhancing the heat transfer performance of such a coiled tube boiler manufactured with a hydraulic expansion technique by providing fins or studs on the expanded coils.

2. Description of the Related Art

There are a variety of power sources operating from heat derived in the oxidation of metallic lithium, for example, U.S. Pat. Nos. 3,964,416 and 4,634,479. U.S. Pat. No. 3,964,416 converts this energy to steam to drive a turbine for propulsion of underwater vehicles. In such devices, it is desirable not to exhaust the products of combustion into the sea.

The Stored Chemical Energy Propulsion System (SCEPS) as disclosed therein employs a lithium-fueled boiler which supplies steam to a turbine. The turbine is connected to a gearbox that drives the propulsor. The boiler consists of two helical coils, an inner and an outer coil, arranged to provide an annular cylindrical cavity for the lithium fuel. Each helical coil is fabricated from stainless steel tubing that is coiled and welded to form the inner and outer containment walls of the boiler. The heat source in the boiler is a result of an exothermic chemical reaction between lithium fuel and injected sulfur hexafluoride ($SF_6$) which acts as the oxidant. The heat generated by the exothermic reaction is transferred from the lithium-fuel side of the boiler to the inside of the tubing and converts feedwater into steam.

Hydraulic expansion manufacturing techniques are known for creating flow channels. U.S. Pat. No. 4,295,255 issued to Weber describes a method of manufacturing a cooling jacket assembly for a control rod drive mechanism. This technology has further been applied to creating a flow channel as depicted in FIG. 1 and is referred to hereinafter as a coiled-tube boiler. The flow channel finds particular utility for both the inner and outer helical coils of the SCEPS boiler as depicted in FIG. 7. To fabricate a flow channel (inner or outer helical coil), one cylinder (12) is placed inside another cylinder (14) and an electron beam welder (not shown) spirally welds in a helical weld path (16) the two cylinders (12, 14) together. After welding, hydraulic pressure is applied between the welds (16) of the two cylinders (12, 14). As the hydraulic pressure increases, the cylinders (12, 14) deform between the helical weld paths (16) creating a flow channel (18) as is illustrated in FIG. 1.

It is also known in the art that internal ribs in tubes increase heat transfer performance as disclosed in U.S. Pat. Nos. 3,088,494 and 4,044,797. These ribs are provided in the tubes after the tube is formed by milling, machining, drawing or swaging processes known in the art.

There are tubes of very hard materials such as Inconel 625 which are extremely difficult to provide ribs in. Also, it can be very costly to form ribs in long sections of tubing. Moreover, in small diameter tubing, it is difficult and sometimes not even practical to form ribs therein.

U.S. patent application Ser. No. 07/666,276 filed Mar. 7, 1991 which is assigned to the Assignee of the present invention and hereby incorporated by reference discloses a method for forming ribs in a coiled tube boiler.

During operation of the SCEPS boiler, by-products of the lithium reaction deposit and freeze on the outer and inner coils when the metal temperature is below about 1450° F. This creates an insulating layer for the coil which decreases the thermal output of the boiler as the operation proceeds.

Studs (2) have been employed on tube membrane walls (3) in conventional boilers for holding a refractory (4) in place on the hot side as shown in FIG. 2. The studs or pins (2) are welded to the tubes (3) at close intervals and covered with a slag-resistant refractory material. This construction increases furnace temperature to maintain the coal, peat, or lignite ash in a liquid state.

It is desirable to improve heat transfer in a stored chemical energy powered coiled tube boiler and other hydraulically expanded heat exchangers. The method should allow for a rapid and simple fabrication of studs or fins in hard materials and on small nonuniform diameter tubing.

SUMMARY OF THE INVENTION

The present invention solves the aforementioned problems with the prior art as well as others by providing a method of increasing the thermal output of a SCEPS boiler by employing fins or studs on the surfaces of the coils. The method of the present invention is simple, inexpensive, and employs a hydraulic expansion manufacturing technique.

The method of the present invention includes machining at least one flat sheet of a metal to form fins, studs, or ribs therein. The first metal sheet is rolled so as to be cylindrical in shape with a longitudinal seam. This first metal sheet is rolled so that the ribs situated therein are positioned either outside or inside the cylindrical shape depending on its use as an inner or outer coil, respectively. A second metal sheet is then rolled so as to form a cylindrical shape with a longitudinal seam. The second metal sheet which is rolled into a cylindrical shape is adapted to fit either outside or inside the first cylindrical shape again depending on its use as an inner or outer coil, respectively. Both longitudinal seams are welded to complete the cylinders. The second cylinder is positioned concentrically outside or inside the first cylinder and then welded together by a high speed welding process, such as electron-beam welding, in a helical weld path. Both ends of the welded integral cylinder are closed with circle seam welds. A pressure fitting is attached to one end so as to be in communication with the helical weld path. Hydraulic pressure is applied between the helical weld paths through the pressure fitting to deform the first and second cylinders between the helical weld paths thus creating a flow channel or passageway having ribs, fins, or studs on the outer diameter (OD) surface of the inner coil and/or the inner diameter surface of the outer coil.

Alternatively, the fins or studs may be welded after a flow channel or passageway is created with a hydraulic expansion technique.

Accordingly, an object of the present invention is to provide a method of manufacturing a flow channel with ribs, fins, or studs which is simple and inexpensive.

Another object of the present invention is to enhance the heat transfer performance in a stored chemical energy powered coiled tube boiler.

Still another object of the present invention is to provide a method for forming ribs, fins, or studs in the outer surface of hard materials or small diameter flow channels which is rapid, inexpensive, and easy to perform.

The various features of novelty characterized in the invention are pointed out with particularity in the claims annexed to and forming a part of this disclosure. For a better understanding of the invention, and the operating advantages attained by its uses, reference is made to the accompanying drawings and descriptive matter in which the preferred embodiments of the invention are illustrated.

DESCRIPTION OF THE PREFERRED EMBODIMENT

Figure 1:
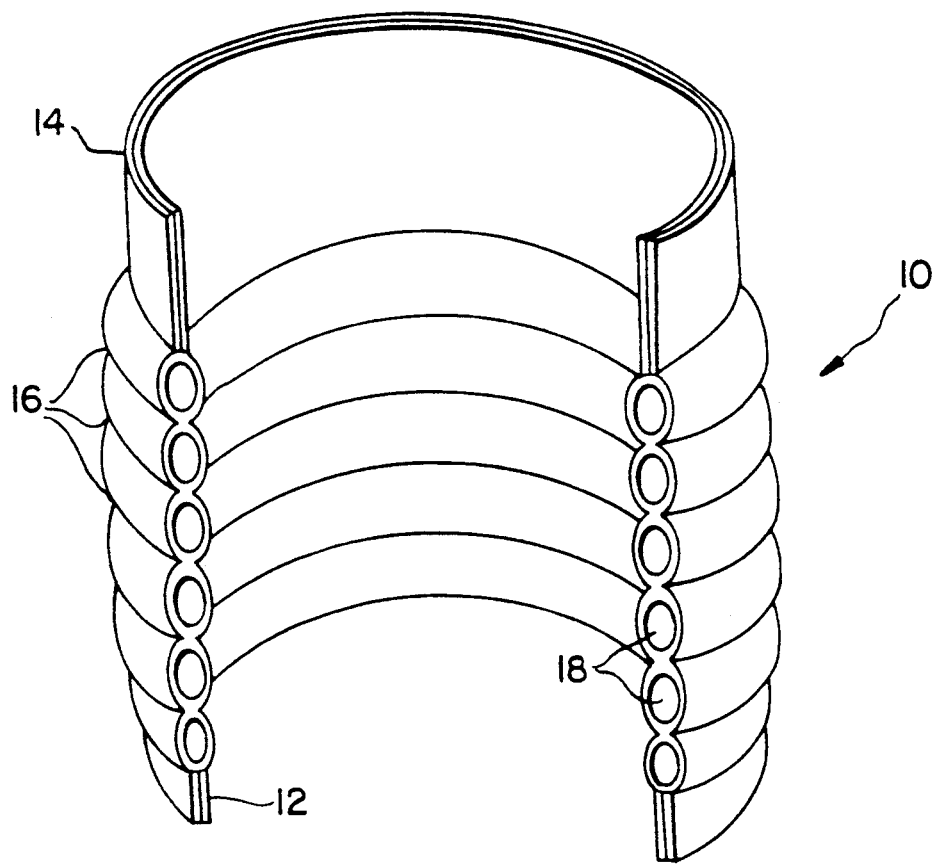
FIG. 1 is a perspective view with a cross-sectional portion removed of a hydraulically expanded flow channel known in the art.
Figure 2:
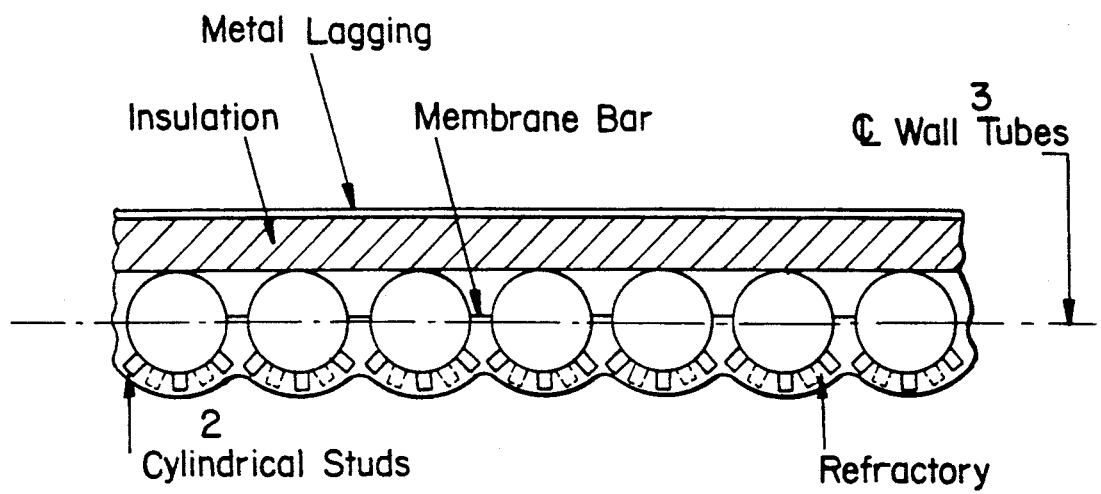
FIG. 2 is a sectional view of a fully studded membrane wall known in the art.
Figure 7:
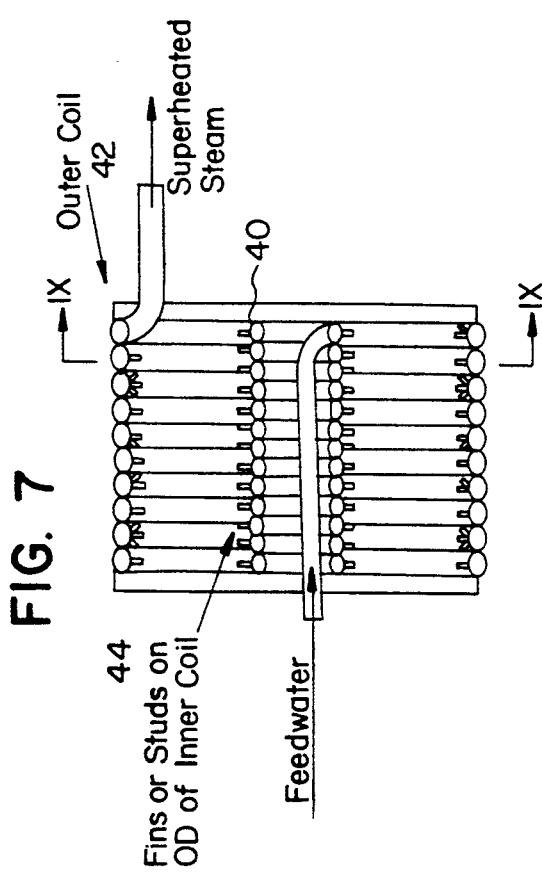
FIG. 7 is a perspective sectional view of a SCEPS coiled tube boiler according to the present invention.

The present invention resides in a method of improving heat transfer in a stored chemical energy powered coiled tube boiler as shown in FIG. 7. In fabricating this type of coiled tube boiler, it is known to hydraulically expand the inner and outer coils (40, 42) respectively from a coiled tube boiler (10) shown in FIG. 1. One cylinder (12) is placed inside a second cylinder (14). A high speed welding process, such as electron beam welding, welds in a spiral weld path (16) the two cylinders (12, 14) together. After welding, a pressure fitting (not shown) is attached and hydraulic pressure is applied between the welds (16) and the two cylinder sheets (12, 14). As the hydraulic pressure is slowly increased, the cylinders (12, 14) deform between the helical welds (16) to create a flow channel (18) therebetween. The manufacturing parameters are taught in U.S. Pat. No. 4,295,255 which is assigned to the present assignee and are hereby incorporated by reference.

U.S. patent application Ser. No. 07/666,276 filed Mar. 7, 1991 now U.S. Pat. No. 5,138,765 issued Aug. 18, 1992 discloses a method for enhancing heat transfer performance by providing ribs in the flow channel. This application is also assigned to the assignee of the present invention and hereby incorporated by reference.

The method of the present invention is directed to improving heat transfer in a stored chemical energy powered coiled tube boiler by providing a series of ribs, fins, or studs (44) on the outer diameter (OD) surface of the inner coil (40) and/or the inner diameter surface of the outer coil (42) as seen in FIG. 7. The term ribs, fins or studs is meant to include any of these features and hereinafter simply are referred to as studs (44). The studs (44) may appear singly or in various multiples.

The studs (44) provide for increased heat transfer by two methods. The first method is that of an extended heat transfer surface. With an extended heat transfer surface, more heat will be transferred to the water and steam. The second method is that the studs (44) extend through the reaction by-products (46) formed during operation of the SCEPS boiler. The studs (44) extend to the reaction zone providing a direct path for the heat of reaction to flow through the stud (44) and boiler wall to the water or steam. With more heat transferred to the water and steam at the inner coil, the fluid enthalpy entering the outer coil is higher. This results in more of the outer coil being in the superheated region and the temperature of the outer coil surface being higher.

Figure 3:
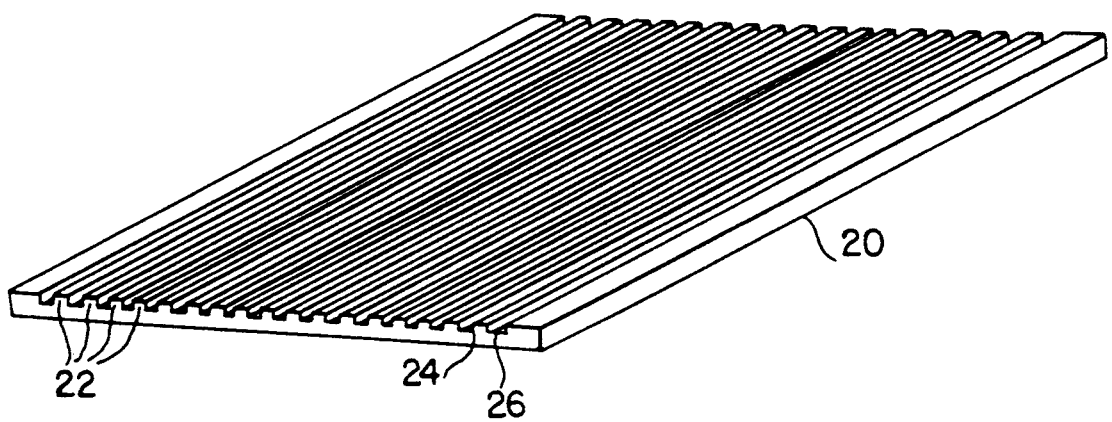
FIG. 3 is a perspective view of a flat metal sheet with ribs formed therein.
Figure 4:
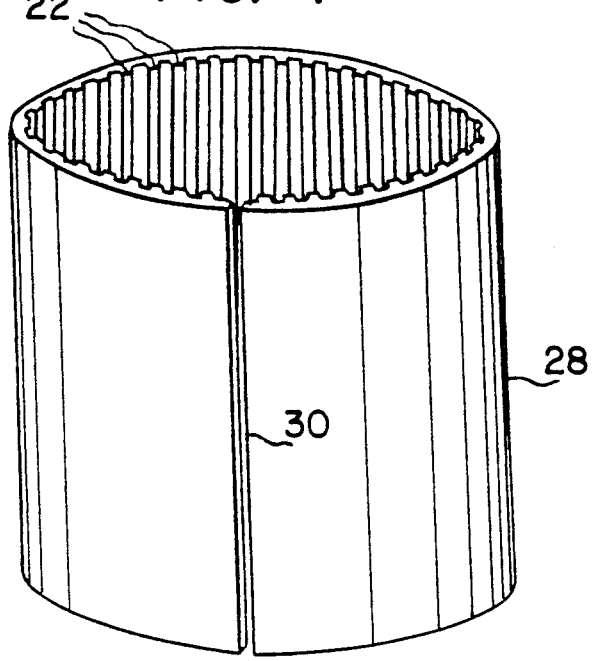
FIG. 4 is a perspective illustration of a rolled metal sheet with the ribs situated inside.
Figure 5:
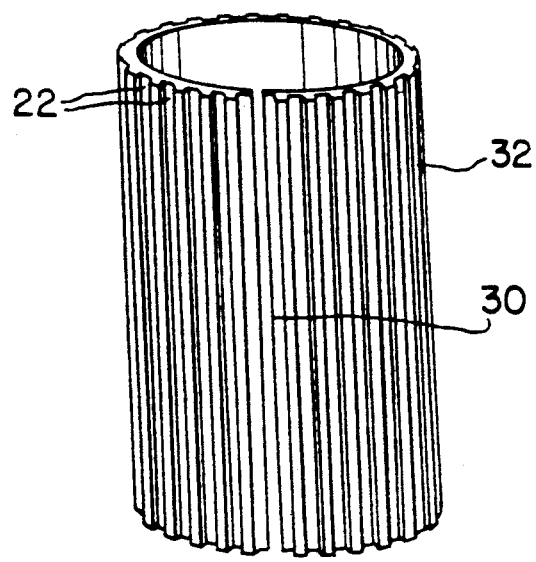
FIG. 5 is a view similar to FIG. 4 with the ribs situated outside.

Referring to FIGS. 3-5, one method is described for fabricating the studs (44) in the SCEPS boiler. A metal sheet (20) is machined or rolled in a known fashion so as to form ribs (22) therein. The ribs (22) consist of an elevated portion referred to as a land (24) and a lowered portion referred to as a valley (26). The term "ribs" (22) as employed herein is meant to include any form of surface roughness such as fins, studs, dimples, grooves, coarse or fine knurling as illustrated in these Figures which have a "raised" and "lower" portion. While FIG. 3 shows a flat metal sheet, the sheet (20) may be cylindrical in shape prior to the machining.

When flat metal sheets are used, two flat metal sheets (20) are rolled to form cylinders (28, 32). The first flat metal sheet (20) is rolled to form a cylinder (28) having a longitudinal seam (30). For the outer coil, the cylinder (28) is rolled in a fashion so that the ribs (22) are located inside the cylinder (28). Then a second cylinder is positioned around cylinder (28). For an inner coil, a flat metal sheet (20) is rolled to form a cylinder (32) with a longitudinal seam (30) but the cylinder (32) is rolled so that the ribs (22) are located on the outside of the cylinder (32). Then, a cylinder is positioned concentrically within the cylinder (32). Prior to placing the cylinders together, the longitudinal seam of both cylinders is welded to complete the cylinders. The equipment used for rolling flat metal sheets in this manner is well known in the art.

It should be readily seen that by fitting a cylinder (32) concentrically around a cylinder (28), a coiled tube boiler is created having ribs on both surfaces.

A high-speed welding process such as electron-beam welding is used to weld with a spiral weld (16) the two cylinders together. The ends of the cylinders are closed with circle seam welds.

One or more pressure fittings (34, 34') are attached to the integral cylinder (36) and hydraulic pressure is slowly applied between the welds (16) so as to deform the cylinders. As the inner and outer cylinders deform under the hydraulic pressure, a studded flow channel (38) is created. Hydraulic water pressures of about 12,000 psi are suitable for expanding a studded flow channel.

The method of the present invention may be used in conjunction with the method disclosed in U.S. patent application Ser. No. 07/666,276 filed Mar. 7, 1991 now U.S. Pat. No. 5,138,765 to create a studded flow channel with internal ribs for a coiler tube boiler.

A Union Carbide Electron Beam Welder Model TC30X60 was used for the electron beam welding of the longitudinal seams with the electron beam weld parameters being as follows:

TABLE 1

| Long Seam Butt Weld Electron Beam Weld Parameters | | |
|---|---|---|
| Material | 316L | IN625 |
| Thickness (in.) | .105 | .094 |
| Gun to Work (in.) | 7 | 7 |
| Beam Current (ma) | 30 | 30 |
| Beam Voltage (kv) | 55 | 55 |
| Beam Focus (Machine Setting) | +3 | 0 |
| Beam Pattern | Sine | Sine |
| Beam Amplitude (Machine Setting) | 10 | 10 |
| Beam Frequency | 1000 | 1000 |
| Weld Speed/Gun Speed (ipm) | 30 | 60 |

The above parameters are for a stainless steel type 316L and Inconel 625 materials. The spiral welds (16) were formed on a rotating collet of the aforementioned welder as described in U.S. Pat. No. 4,295,255 which is hereby incorporated by reference. The electron beam weld parameters for welding the spiral weld (16) are set forth in Table 2.

TABLE 2

| Electron Beam Welding Parameters - Spiral Weld | | |
|---|---|---|
| Component Weld Type | Split Beam Partial Penetration | Full Penetration |
| Grade Thickness | 316L/0.105 IN625/0.094 | IN625/0.094 |
| Gun to Work (in.) | 7 | 7 |
| Beam Current (ma) | 65 | 70 |
| Beam Voltage (kv) | 55 | 55 |
| Beam Focus | Surface | Surface |
| Beam Type | Split Circle | Circle |
| Beam Amplitude (Machine Setting) | 45 60 (dither) | 35 — |
| Beam Frequency | 4000 | 500 |
| Square Wave (HZ) | 500 | — |
| Weld Speed (ipm) | 45 | 45 |
| Helix (in.) | 1.50 | 1.50 |
| Gun Speed (Machine Setting ipm) | 1.32 | 1.32 |
| Work RPM (rpm) (Machine Setting) | 0.87 | 0.87 |
| Weld Width (in.) | 0.105 | 0.085 |

A pressure source P attaches to the pressure fitting (34) to supply a hydraulic pressure of about 12,000 psi which deforms the outer cylinder and the inner cylinder to create the studded flow passage (38) of the integral cylinder (36). If an additional pressure fitting (34') is employed at the opposite end of integral cylinder (36), pressure fitting (34') should be plugged during the hydraulic expansion.

Pressure fittings (34, 34') suitable for the present invention are well known and include, for example, Swagelok ® connectors.

Since the hydraulic expansion manufacturing technique produces the studded flow channel (38) with a diameter determined by the electron beam weld (16) spacing, there exists the added advantage of producing a variable diameter studded flow channel (38), merely by changing the electron beam weld (16) spacing. This variable diameter capability may be utilized for optimizing heat transfer in hydraulically expanded heat exchangers such as coiled tube boilers (10).

Figure 6:
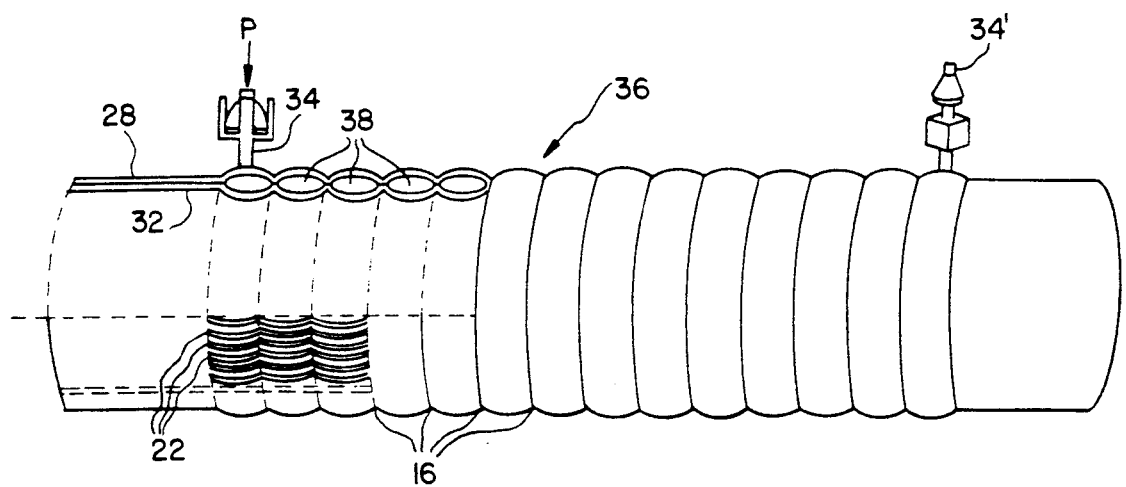
FIG. 6 is a perspective view of a manufactured ribbed flow channel in accordance with the present invention with cross-sectional portions removed to illustrate the pressure fitting and the ribs.
Figure 9:
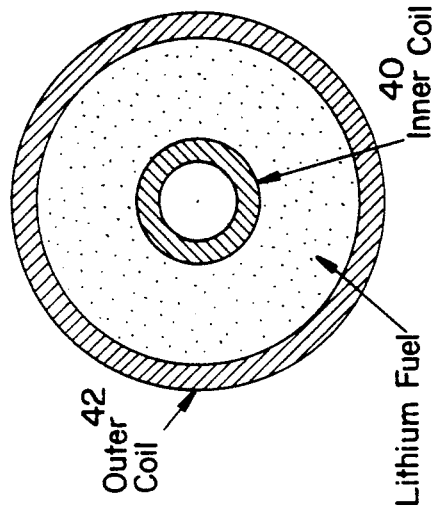
FIG. 9 is a sectional view taken at IX—IX in FIG. 7 illustrating the concentric inner and outer coils.
Figure 8:
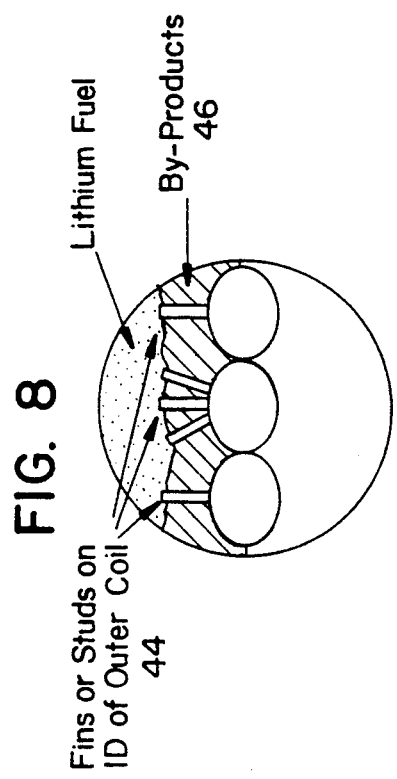
FIG. 8 is an enlarged view illustrating a portion of FIG. 7.

The integral cylinder (36) in FIG. 6 has a studded flow channel (38) which increases the convective heat transfer performance. The flow channel (38) may optionally include internal ribs if desired. The internal ribs preferably are situated perpendicular or nearly perpendicular to the flow channel for increasing the convective heat transfer performance in the single phase region, that is, the subcooled water or superheated steam.

For the two-phase region which is a mixture of water and steam, the internal ribs preferably have a helix angle $\theta$ of about 50° to 70° as disclosed in U.S. patent application Ser. No. 07/666,276 filed Mar. 7, 1991. Ribs with this angle swirl the flow which results in a water film on the inner diameter (ID) of the ribbed flow channel. The water film prevents the departure from nucleate boiling (DNB) and thus avoids the poor heat transfer associated with the DNB condition.

The present invention provides several advantages including but not limited to the following:

a) The addition of studs or fins to the outer diameter surface of the inner coil provides for an extended heat transfer surface. The greater heat transfer prevents the freezing of reaction by-products to the surface of the coil.

b) The addition of studs or fins to the outer diameter surface of the inner coil or to the inner diameter surface of the outer coil provides a direct path for heat flow through the by-products to the boiler wall. This results in enhanced thermal performance.

c) The superheated steam temperature and the thermal output of the boiler does not deteriorate until such time as the stored chemical energy fuel is expended.

d) The improvements of the present invention result in improved transient thermal response of the SCEPS boiler.

Because an inner and outer cylinder are used to form each coiled tube boiler in accordance with the present invention, this design allows the use of different alloys for the inside and the outside cylinder. This option is not possible with tubing. A material with high thermal conductivity, for example, could be used on the lithium reaction side, thus leading to higher heat transfer and reduced metal temperatures.

Use of the hydraulically expanded process may further include producing cooling channels in end caps (not shown) for the ribbed coiled tube boiler. The end caps are currently uncooled, however, by forming channels therein using the concept of the present invention, there is produced more heat transfer surface and steam production capacity.

As an alternative, the surface area of the inner coil exposed to the heat of reaction could be made larger. One method of making a larger surface is to make the inner coil of a large diameter.

While a specific embodiment of the invention has been shown and described in detail to illustrate the application of principles of the invention, certain modifications and improvements will occur to those skilled in the art upon reading the foregoing description. Modifications could be made to the present invention for other specific applications in heat exchangers that do not require a coiled tube boiler configuration. An example of such modifications is the utilization of the present invention in a studded hydraulically expanded panel wall for heat removal in furnaces, refrigerators and solar energy collectors.

It is thus understood that all such modifications and improvements have been deleted herein for the sake of conciseness and readability but are properly in the scope of the following claims.

We claim:

1. A method of manufacturing a studded flow channel, comprising the steps of:
   forming studs in at least one flat metal sheet;
   rolling the studded metal sheet to form a first cylinder having a longitudinal seam, the first metal sheet being rolled so that the studs situated therein are positioned outside the first cylinder;
   rolling a second metal sheet to form a second cylinder having a longitudinal seam, the second cylinder being constructed to fit concentrically within the first cylinder;
   welding the longitudinal seams of both the first and second cylinders;
   positioning the second cylinder inside the first cylinder;
   welding in a helical path the two cylinders together to form one integral cylinder;
   closing both ends of the integral cylinder with circle seam welds;
   attaching a pressure fitting to one end of the integral cylinder in communication with a helical weld path; and
   applying a hydraulic pressure between the helical weld paths through the pressure fitting for deforming the sheets between the helical weld paths creating a studded flow channel.

2. A method of manufacturing a studded flow channel, comprising the steps of:
   forming studs in at least one flat metal sheet;
   rolling the studded metal sheet to form a first cylinder having a longitudinal seam, the first metal sheet being rolled so that the studs situated therein are positioned inside the first cylinder;
   rolling a second metal sheet to form a second cylinder having a longitudinal seam, the second cylinder being constructed to fit concentrically around the first cylinder;
   welding the longitudinal seams of both the first and second cylinders;
   positioning the second cylinder around the outside of the first cylinder;
   welding in a helical path the two cylinders together to form one integral cylinder;
   closing both ends of the integral cylinder with circle seam welds;
   attaching a pressure fitting to one end of the integral cylinder in communication with a helical weld path; and
   applying a hydraulic pressure between the helical weld paths through the pressure fitting for deforming the sheets between the helical weld paths creating a studded flow channel.

3. A method as recited in claim 1, further comprising the step of radially expanding the second cylinder after the positioning step for obtaining a tight mechanical fit.

4. A method as recited in claim 2, further comprising the step of radially expanding the first cylinder after the positioning step of obtaining a tight mechanical fit.

5. A method of manufacturing a studded flow channel, comprising the steps of:
   rolling a first metal sheet to form a first cylinder having a longitudinal seam;
   rolling a second metal sheet to form a second cylinder having a longitudinal seam, said second cylinder being adapted to fit concentrically within the first cylinder;
   welding the longitudinal seams of both the first and second cylinders;
   forming studs on the outside of the first cylinder;
   positioning the second cylinder inside the first cylinder;
   welding in a helical path the two cylinders together to form one integral cylinder;
   closing both ends of the integral cylinder with circle seam welds;
   attaching a pressure fitting to one end of the integral cylinder in communication with a helical weld path; and
   applying a hydraulic pressure between the helical weld paths through the pressure fitting for deforming the sheets between the helical weld paths creating a studded flow channel.

6. A method of manufacturing a studded flow channel, comprising the steps of:
   rolling a first metal sheet to form a first cylinder having a longitudinal seam;
   rolling a second metal sheet to form a second cylinder having a longitudinal seam, said second cylinder being adapted to fit concentrically around the first cylinder;
   welding the longitudinal seams of both the first and second cylinders;
   forming studs on the inside of the first cylinder;
   positioning the second cylinder around the first cylinder;
   welding in a helical path the two cylinders together to form one integral cylinder;
   closing both ends of the integral cylinder with circle seam welds;
   attaching a pressure fitting to one end of the integral cylinder in communication with a helical weld path; and
   applying a hydraulic pressure between the helical weld paths through the pressure fitting for deforming the sheets between the helical weld paths creating a studded flow channel.

7. A method as recited in claim 5, further comprising the step of radially expanding the second cylinder after the positioning step for obtaining a tight mechanical fit.

8. A method as recited in claim 6, further comprising the step of radially expanding the first cylinder after the positioning step for obtaining a tight mechanical fit.

9. A method of making a studded flow channel hydraulically expanded heat exchanger, comprising the steps of:
   forming studs into at least one metal sheet;
   positioning a metal sheet on the at least one studded metal sheet, the studs being situated on a predetermined side of the metal sheet;
   welding the metal sheets together with a plurality of weld paths for defining a plurality of channels with all of the channels being connected;
   attaching a pressure fitting to at least one channel; and
   applying a hydraulic pressure through the pressure fitting for deforming the metal sheets for creating a studded flow channel.

10. A method as recited in claim 9, further comprising the step of shaping the at least one metal sheet into a predetermined form prior to hydraulic expansion.

11. A method as recited in claim 9, wherein the forming step includes forming studs into two metal sheets.

* * * * *